US012285741B2

(12) United States Patent
Wang et al.

(10) Patent No.: US 12,285,741 B2
(45) Date of Patent: Apr. 29, 2025

(54) METHOD FOR MAKING SMART SAND

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Peng Wang, Thuwal (SA); Jian Chang, Thuwal (SA); Zeyad Ahmed, Dhahran (SA); Yifeng Shi, Thuwal (SA); Chisiang Ong, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

( * ) Notice: Subject to any disclaimer, the term of this patent is extended or adjusted under 35 U.S.C. 154(b) by 573 days.

(21) Appl. No.: 17/621,315

(22) PCT Filed: May 22, 2020

(86) PCT No.: PCT/IB2020/054899
§ 371 (c)(1),
(2) Date: Dec. 21, 2021

(87) PCT Pub. No.: WO2020/260976
PCT Pub. Date: Dec. 30, 2020

(65) Prior Publication Data
US 2022/0355272 A1    Nov. 10, 2022

Related U.S. Application Data

(60) Provisional application No. 62/900,905, filed on Sep. 16, 2019, provisional application No. 62/865,477, filed on Jun. 24, 2019.

(51) Int. Cl.
| | | |
|---|---|---|
| *B01J 20/28* | (2006.01) | |
| *B01D 17/02* | (2006.01) | |
| *B01J 20/10* | (2006.01) | |
| *B01J 20/26* | (2006.01) | |
| *B01J 20/289* | (2006.01) | |
| *B01J 20/32* | (2006.01) | |
| *C02F 1/28* | (2023.01) | |
| *C02F 1/40* | (2023.01) | |
| *C02F 101/32* | (2006.01) | |

(52) U.S. Cl.
CPC ........ *B01J 20/289* (2013.01); *B01D 17/0202* (2013.01); *B01J 20/103* (2013.01); *B01J 20/261* (2013.01); *B01J 20/28016* (2013.01); *B01J 20/28052* (2013.01); *B01J 20/3204* (2013.01); *B01J 20/3219* (2013.01); *B01J 20/3278* (2013.01); *B01J 20/3295* (2013.01); *C02F 1/288* (2013.01); *C02F 1/40* (2013.01); *B01J 2220/52* (2013.01); *C02F 1/281* (2013.01); *C02F 1/285* (2013.01); *C02F 2101/32* (2013.01)

(58) Field of Classification Search
CPC ........ B01J 20/28; B01J 20/289; B01J 20/103; B01J 20/261; B01J 20/28016; B01J 20/28052; B01J 20/3204; B01J 20/3219; B01J 20/3278; B01J 20/3295; B01J 2220/52; B01D 17/0202; C02F 1/288; C02F 1/40; C02F 1/281; C02F 1/285; C02F 2101/32
USPC ........................................ 502/407
See application file for complete search history.

(56) References Cited

U.S. PATENT DOCUMENTS 10,131,556 B1 * 11/2018 Atta .................... B01J 20/3295

FOREIGN PATENT DOCUMENTS

WO    2013046056 A2    4/2013

OTHER PUBLICATIONS

First Examination Report in corresponding/related Saudi Arabian Patent Application No. 521431204, dated Mar. 26, 2023.
Li, J., et al., "Underoil Superhydrophilic Desert Sand Layer for Efficient Gravity-Directed Water-in-Oil Emulsions Separation with High Flux," Journal of Materials Chemistry A, Nov. 29, 2017, vol. 6, pp. 223-230, The Royal Society of Chemistry.
Maaz, M., et al., "Poly(4-Vinylpyridine)-Modified Silica for Efficient Oil/Water Separation," Journal of Materials Science, Sep. 11, 2018, vol. 54, pp. 1184-1196, Springer.
Chen, L., et al., "Superhydrophobic Sand: A Cope for Desert Water Storage and Transportation Projects," Journals of Materials Chemistry A, Feb. 18, 2017, pp. 6416-6423, The Royal Society of Chemistry.
International Search Report in corresponding/related International Application No. PCT/IB2020/054899, date of mailing Jul. 29, 2020.
Men, X., et al., "Facile Fabrication of Superhydrophobic Sand: Potential Advantages for Practical Application in Oil-Water Separation," Journal of the Taiwan Institute of Chemical Engineers, Dec. 10, 2015, vol. 60, pp. 651-655, Elsevier B.V.
Written Opinion of the International Searching Authority in corresponding/related International Application No. PCT/IB2020/054899, date of mailing Jul. 29, 2020.
Yong, J., et al., "Oil-Water Separation: A Gift from the Desert," Advanced Materials Interfaces, Jan. 22, 2016, vol. 3, pp. 1500650 1-7, Wiley-VCH Verlag Gmbh & Co. KGaA, Weinheim.
Zhang, L., et al., "Smart Surfaces with Switchable Superoleophilicity and Superoleophobicity in Aqueous Media: Toward Controllable Oil/Water Separation," NPG Asia Materials, Feb. 17, 2012. vol. 4, e8, pp. 1-8.

* cited by examiner

Primary Examiner — Edward M Johnson
(74) Attorney, Agent, or Firm — PATENT PORTFOLIO BUILDERS PLLC

(57) ABSTRACT

A smart sand includes raw sand particles, synthetic $SiO_2$ particles attached to the raw sand particles, a first material attached to a first set of the synthetic $SiO_2$ particles, a second material attached to a second set of the synthetic $SiO_2$ particles, and a third material attached to the first material. Each of the first to third materials is different from each other.

8 Claims, 16 Drawing Sheets

METHOD FOR MAKING SMART SAND

CROSS-REFERENCE TO RELATED APPLICATIONS

This application is a U.S. National Stage Application of International Application No. PCT/IB2020/054899, filed on May 22, 2020, which claims priority to U.S. Provisional Patent Application No. 62/865,477, filed on Jun. 24, 2019, entitled "SMART SAND: TOWARDS CONTROLLABLE OIL/WATER SEPARATION," and U.S. Provisional Patent Application No. 62/900,905, filed on Sep. 16, 2019, entitled "SMART SAND AND METHOD FOR OIL-WATER SEPARATION," the disclosures of which are incorporated herein by reference in their entirety.

BACKGROUND

Technical Field

Embodiments of the subject matter disclosed herein generally relate to a smart sand that is capable of separating water from a water emulsion, and more particularly, to functionalizing raw sand so that the obtained smart sand acts as an oil sorbent and its oil sorption and desorption can be changed in response to a change in a pH.

Discussion of the Background

The process of separating water from a water emulsion (e.g., water-oil emulsion) requires either an appropriate demulsifier/surfactant for separating the two components, or a smart medium that can achieve this separation.

In the petroleum industry, the separation of water from the extracted crude oil is required before processing the oil for the following reasons. When the crude oil is processed at refineries, the water present in the crude oil might corrode the pipes and other equipment used by these refineries. As this equipment is expensive, it is a requirement in the industry to have the water removed from the crude oil prior to being processed.

Alternatively, with the increasing amounts of industrial oily wastewater and frequent occurrence of crude oil spill accidents, a cost-effective and efficient oil/water separation material that could significantly improve the quality of the oil spill cleanup and the treated oily wastewater effluent is highly desired. In the past decade, the progress in advanced interfaces with super-wettability towards water or oil has made a great contribution to the development of the next generation oil/water separation systems, particularly in adsorption- and filtration-based separation, by using modified sponge, mesh, textile, membrane, etc. Although the oil/water separation efficiency of the materials reported in literature is promising, their efficiency at large scale applications is still restricted due to the complicated surface modification processes, high material cost, and low recyclability during practical oil/water separation.

The raw sand, which can be abundantly obtained from various sources, for example, deserts, rivers and seashore, has been considered as a promising alternative for oil/water separation due to its natural superhydrophilic and underwater superoleophobic properties without any need for further post-treatment. In this regard, [1] developed an oil/water separation process by using raw sand with excellent water absorption and ultralow oil adhesion ability. In contrast, [2] modified the sand surfaces with alkyl silanes, which directly transformed the hydrophilic surfaces into having superhydrophobic and superoleophilic properties. Recently, [3] developed an under-oil superhydrophilic sand for the separation of various water-in-oil emulsions driven by gravity, because the modified sand could capture micron-sized water droplets in oil-rich solutions. In addition to the low-cost of the material and operating the raw sand, the benefits of using this type of material for the oil/water separation also include the tunable operating scale of this process as the separation process can be easily controlled by adjusting the amount of used sand.

Furthermore, considering the recyclability and versatility requirement for the oil-water separation processes in various practical applications, it is highly desired to have a separation material with a controllable surface wettability, which can be modulated by external stimuli. By using smart materials with switchable wettability, the absorbed oil can be easily recovered, and the smart materials can be then recycled for multicycle usage, making them a sustainable and cost-effective solution to oily wastewater treatment or oil spill cleanup.

Among the existing smart materials, the pH-responsive ones are considered attractive due to their fast wettability switch, which is triggered by the changes of the environment's pH. A series of smart surface materials have been recently reported in [4] by grafting a pH-responsive poly(2-vinyl pyridine-b-dimethyl siloxane) (P2VP-b-PDMS) block copolymer onto nonwoven textiles and polyurethane sponges via high temperature quaternization under vacuum condition. The developed materials possess switchable oil wettability under different pHs, which can be used for controllable oil/water separation processes. Similarly, poly (4-vinylpyridine) P4VP-based silica with a switchable water contact angle between $73°±2°$ and $18°±1°$ was also fabricated by [5] for oil/water separation.

However, smart sand with pH-responsive oil wettability has never been developed for the oil/water separation. Thus, there is a need for such a smart sand as this material is cheap and abundant.

BRIEF SUMMARY OF THE INVENTION

According to an embodiment, there is a smart sand that includes raw sand particles, synthetic $SiO_2$ particles attached to the raw sand particles, a first material attached to a first set of the synthetic $SiO_2$ particles, a second material attached to a second set of the synthetic $SiO_2$ particles, and a third material attached to the first material. Each of the first to third materials is different from each other.

According to another embodiment, there is a method for making a smart sand and the method includes providing raw sand particles, coating the raw sand particles with synthetic $SiO_2$ particles, adding a first material to a first set of the synthetic $SiO_2$ particles, adding a second material to a second set of the synthetic $SiO_2$ particles, and grafting a third material to the first material to obtain the smart sand. Each of the first to third materials is different from each other.

According to still another embodiment, there is a system for separating oil from water, and the system includes a container having an input and an output, and a layer of smart sand that divides the container into a first chamber and a second chamber. An oil-water mixture is provided on one side of the layer of smart sand, into the first chamber, and the smart sand allows one of an oil and a water of the oil-water mixture to pass the smart sand into the second chamber, but not the other of the oil and the water.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a smart sand that is based on a modified raw sand. However, the embodiments to be discussed next are not limited to modified raw sand, but may be applied to non-modified sand.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel smart sand is fabricated for oil/water separation by grafting P4VP and octadecyltrimethoxysilane (OTS) onto the surface of silica particles of a pre-modified raw sand. The as-prepared smart sand displays highly switchable superoleophilicity and superoleophobicity under water in response to different pHs of the water, which allows for its easy regeneration in aqueous solutions at room temperature. The smart sand has been found to absorb oil and the absorbed oil can be easily and rapidly released from the smart sand after acid treatment. Further, the smart sand shows good oil/water separation with a high water flux for immiscible oil/water mixture driven by gravity, as well as good recyclability.

Figure 1:
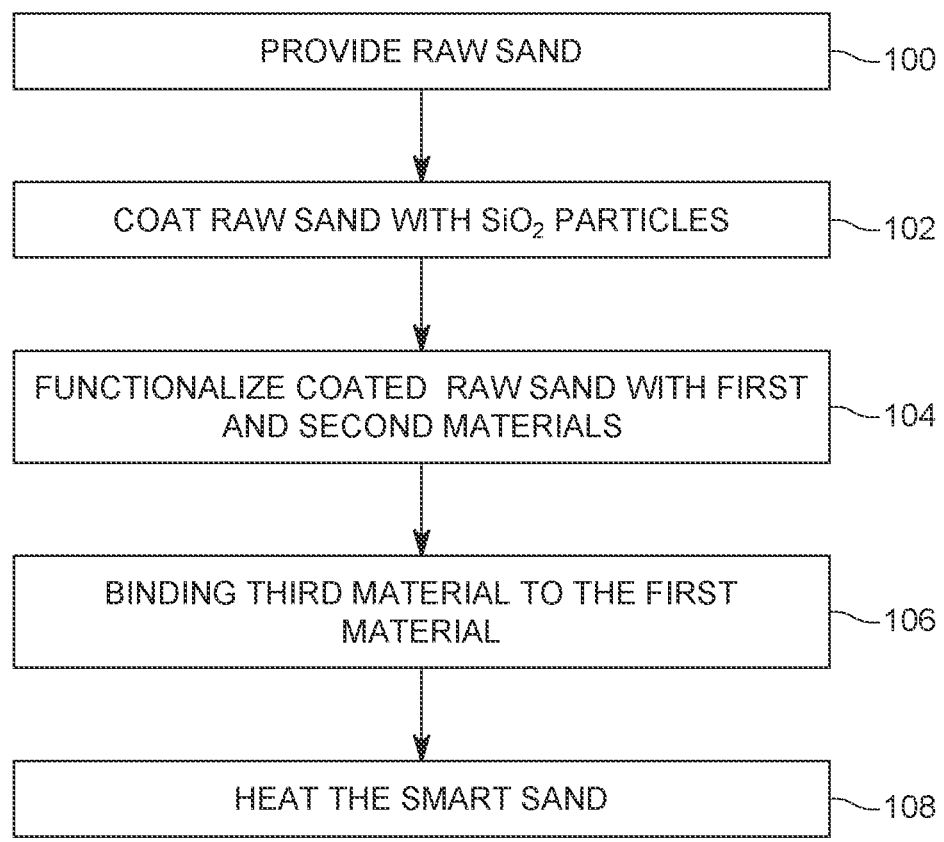
FIG. 1 is a flowchart of a method for manufacturing a smart sand based on raw sand.

A method for manufacturing this smart sand is now discussed with regard to FIG. 1. In step 100, raw sand is provided. The raw sand can be any sand. For the experiment run by the inventors, the raw sand was obtained from the desert in Saudi Arabia. Optionally, the sand can be cleaned with ethanol and then deionized in water in an ultrasonic cleaner.

Figure 2A:
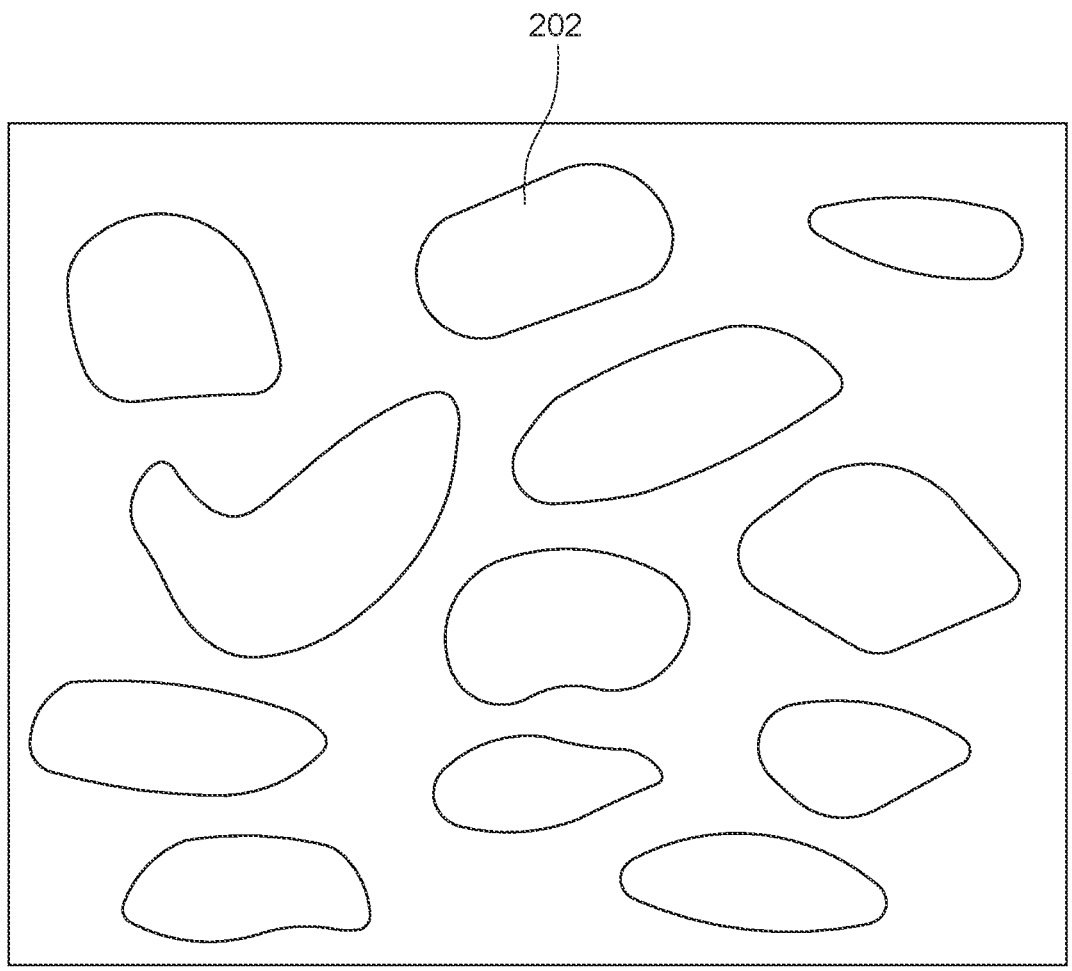
FIGS. 2A-2C schematically illustrates various stages during the manufacturing process of the smart sand.
Figure 2B:
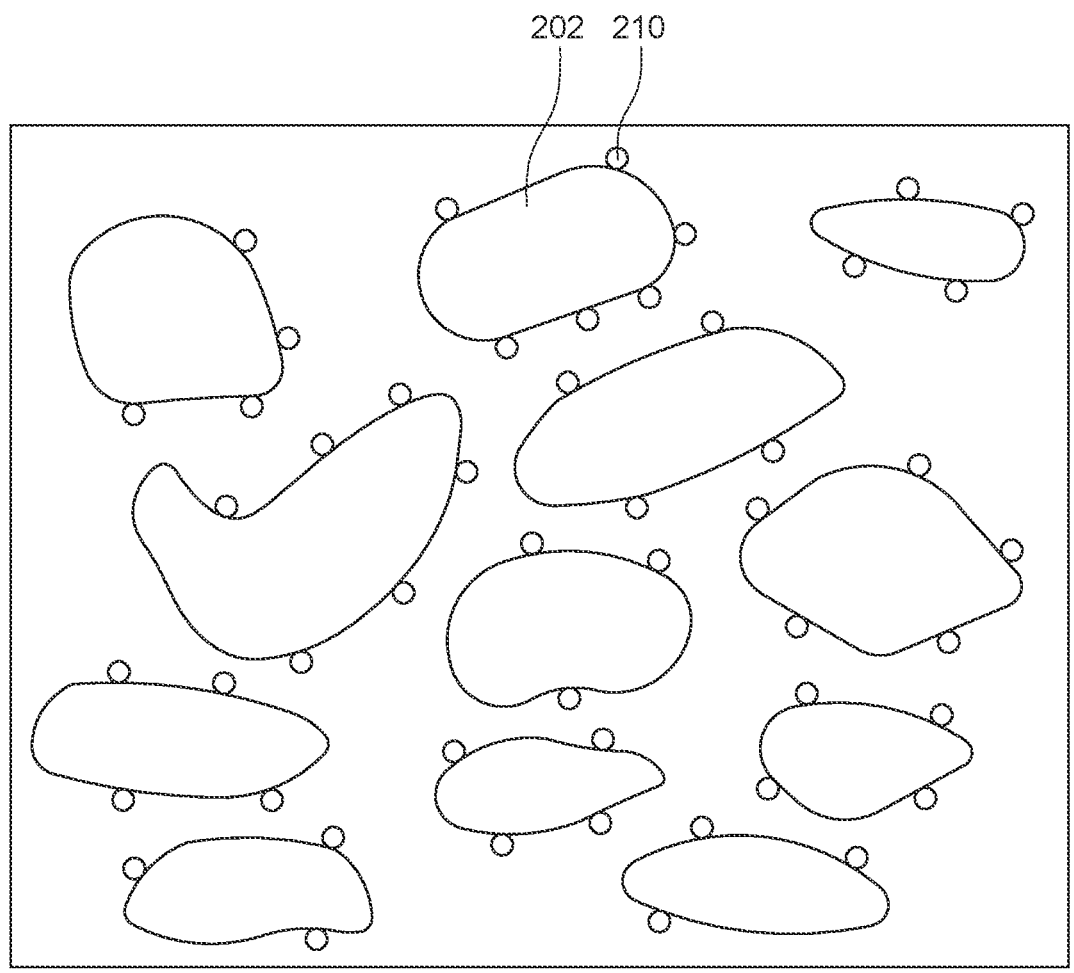

In step 102, the surface of the raw sand is modified to be positively charged. For example, 100 mL of 50 mg/mL cetyltrimethyl ammonium bromide (CTAB) aqueous solution was added to 25 g of sand in 200 mL ethanol solution, and then the mixture was stirred for 1 h. Note that the numbers indicated in this embodiment are exemplary, but the same product may be obtained if these numbers vary in a range of +/−30%. In fact, all the values presented herein can be modified in this range and still achieve the novel smart sand. Thus, none of the steps discussed with regard to FIG. 1 should be construed as requiring the exact numbers that are provided herein. These numbers are disclosed only for giving the reader a sense of the ratios used for the added groups to the raw sand. Returning to step 102, the pH value of the mixture solution was adjusted to 12 by using ammonium hydroxide. 20 mL tetraethoxysilane (TEOS) was then added drop-wise to the above mixture followed by continuous and vigorous stirring for 12 h for coating the raw sand with $SiO_2$ particles. Note that although the raw sand (see FIG. 2A) is made of natural $SiO_2$ particles 202, the added $SiO_2$ particles 210 (see FIG. 2B) are synthetic particles and they have a diameter smaller than the diameter of the raw sand 202. The added synthetic $SiO_2$ particles 210 are a result of a chemical reaction between the TEOS and water. Thus, in step 102, the raw sand particles 202 are effectively coated with the $SiO_2$ particles 210. Optionally, the $SiO_2$ coated raw sand may be rinsed with deionized water followed by drying in an oven at 60° C.

Figure 2C:
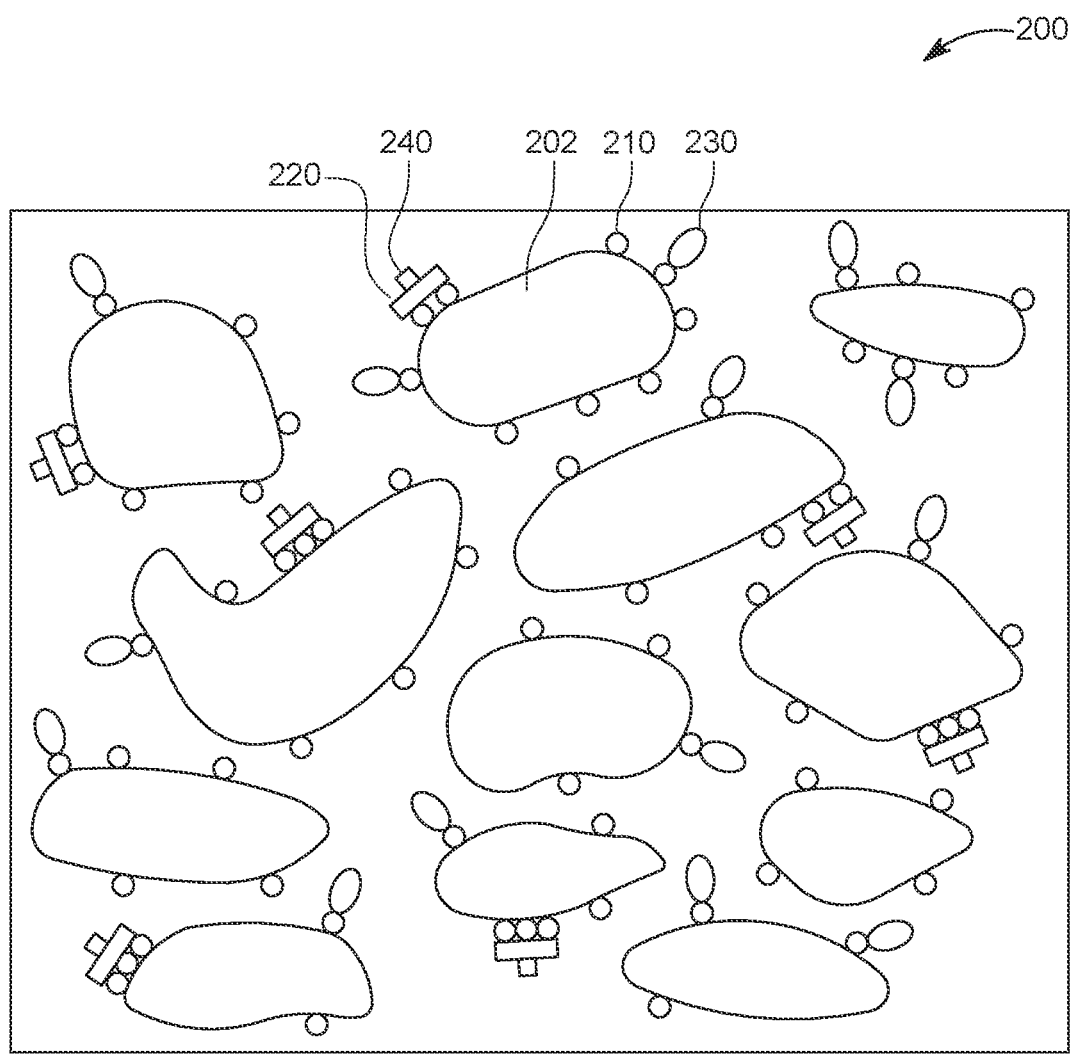

In step 104, the $SiO_2$-coated raw sand 210 is functionalized with first and second materials 220 and 230, as shown in FIG. 2C. Note that FIG. 2C is a cartoon type figure that schematically illustrates the first and second materials 220 and 230. The figure does not intend to show the exact amount of these two materials that are attached to the raw sand, or the shape of these materials. However, the figure indicates that the first material 220 is attached to a first set of the $SiO_2$ particles 210 while the second material 230 is attached to a second set of the $SiO_2$ particles 210. In one application, the first material is (3-bromopropyl)trimethoxysilane (BPS) and the second material is octadecyltrimethoxy-silane (OTS). Other materials may be used as long as they implement the following functions. The first material, the BPS, is used as a binder for a third material that is discussed later. More specifically, the BPS is used to functionalize the surface of the $SiO_2$-coated raw sand 210 with bromoalkyl groups via silanization, which serves as a binder for subsequent grafting of poly(4-vinylpyridine) (P4VP) on its surface. The second material, the OTS, provides low-surface energy chains to give hydrophobicity to the smart sand under non-acidic condition.

This step may be implemented, in one application, as follows. The 25 g of $SiO_2$-coated raw sand is added into a 200 ml of toluene solution containing 2 g of BPS and OTS to functionalize the sand surface with bromoalkyl groups and alkyl groups via silanization. The ratio of BPS and OTS can be changed depending of the application. In the experiments performed by the inventors, this ratio was changed to 0:10, 1:9, 3:7, 5:5, 7:3, 9:1, 10:0, respectively. After continuous and vigorous stirring for 12 h at room temperature, the silanized sand was rinsed with toluene and ethanol to remove the unreactive siloxane followed by drying in the oven at 60° C.

The dried silanized sand was then added in step 106 to a third material 240 for binding the third material 240 directly to the first material 220, i.e., BPS, as shown in FIG. 2C. In this embodiment, the third material 240 is P4VP and the dried silanized sand was added to 1 wt % ethanol solution of P4VP under stirring for 1 h so that the P4VP material bonded directly to the BPS, to obtain the smart sand 200. In step 108, the smart sand was heated under vacuum at 150° C. for 12 h to enable quaternization between the bromoalkyl groups of BPS and the pyridine groups of P4VP. The unreactive polymers were removed by washing with large amounts of ethanol. The grafted P4VP endows the sand surface with a pH-responsive wettability.

The obtained smart sand 200 has been characterized with a scanning electron microscope and scanning electron microscopy (SEM) images were taken. Contact angles (CAs) were measured on a commercial contact angle system at ambient temperature. The X-ray photoelectron spectroscopy (XPS) was carried out under ultrahigh vacuum conditions in the range of ~$10^{-9}$ mbar by using a monochromatic Al Kα X-ray source (hv=1486.6 eV) operated at 150 W.

To test the sorption and desorption of the oil to the smart sand 200, the following experiments have been performed. Hexadecane oil dyed with oil red O was placed onto the surface of the water in a glass container. Then an amount of the smart sand was added to the glass container. The hexadecane oil was adsorbed directly by the smart sand, and the saturated oily sand then sank to the bottom of the glass container driven by the gravity. To release the hexadecane oil from the hexadecane-loaded smart sand, the pH of the water was modified to be in the range from 1 to 3, to change the oil wettability of the smart sand. As a result of this action, it was observed that the oil separated from the smart sand. Note that the pH of the water could be changed either by adding acidic water or by adding just an acid to the existing water.

Figure 3A:
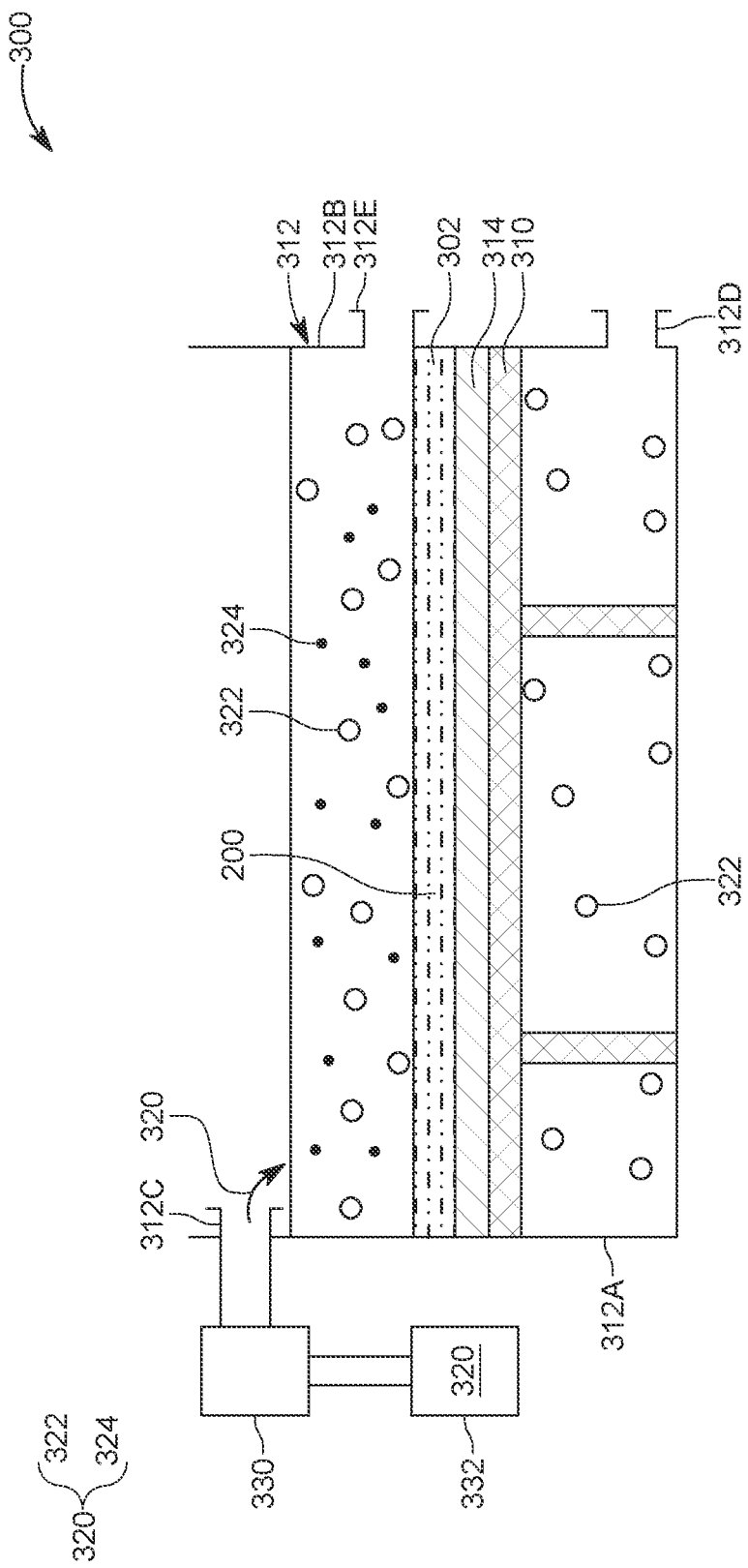
FIGS. 3A and 3B illustrate water-oil separation systems that use the smart sand to separate the oil from the water.
Figure 3B:
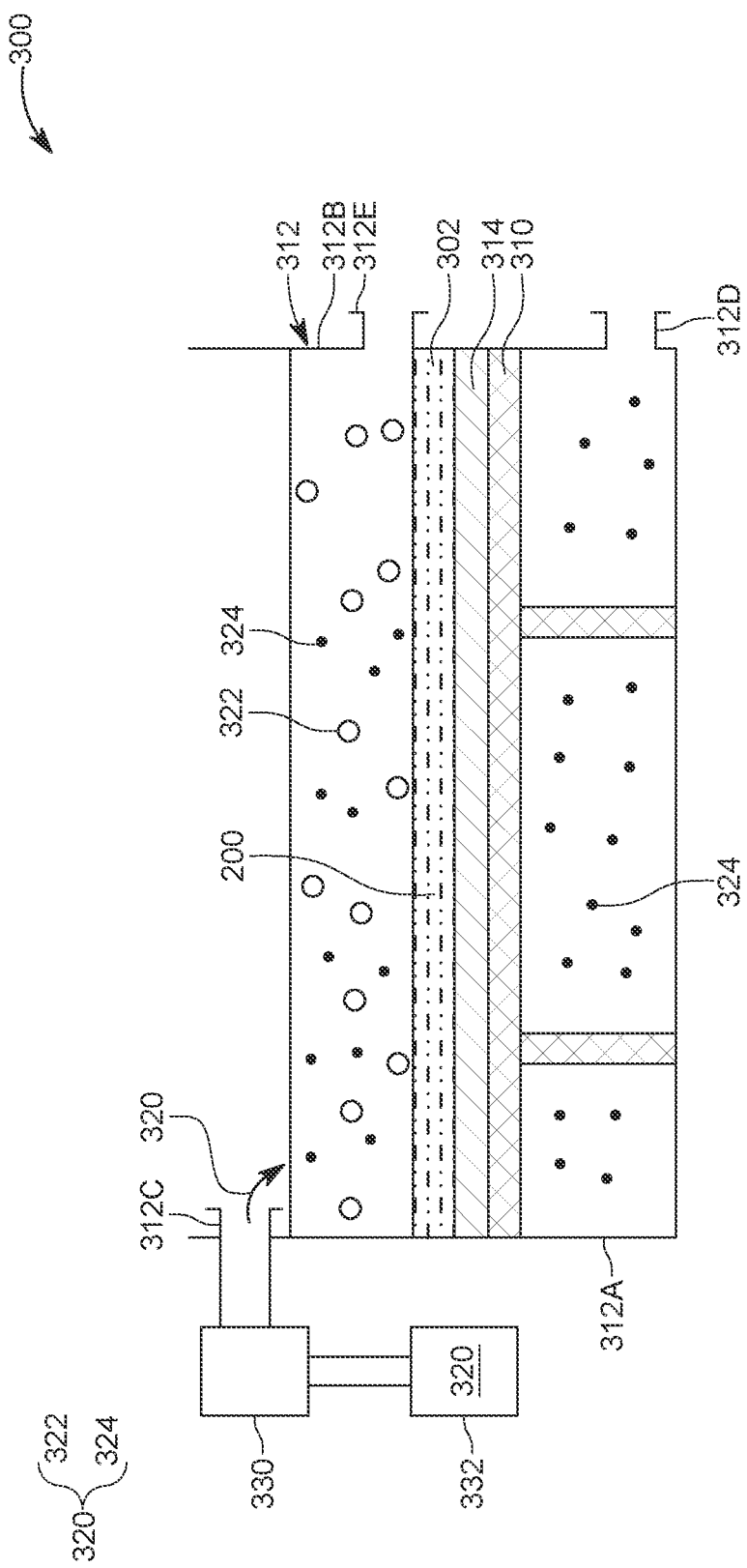

In another experiment, an oil-water separation system 300, shown in FIGS. 3A and 3B, was used to separate the oil from an oil and water mixture. The system 300 includes a layer 302 of smart sand 200 that was placed on a mesh support 310 in a container 312. The layer 302 of smart sand has a given thickness, for example, from 1 to 4 cm. A layer 314 of textile or equivalent material (e.g., non-woven textile) was placed between the support 310 and the layer 302 of smart sand, below the smart sand, to prevent the smart sand from falling into the bottom part 312A of the container 312. With the non-acidic pretreated smart sand 200 placed above the textile layer 314, a mixture 320 of hexadecane oil 322 dyed with oil red O and water 324 of pH 6.5 dyed with methylene blue, in a ratio of 3:1, was pumped with a pump 330, from a storage tank 332, into the upper part 312B of the container 312, and the separation of the oil from the water was achieved driven by gravity. The hexadecane oil 322 successfully passed through the sand layer 302 to the lower part 312A of the container 312, whereas the water 324 remained in the upper part 312B, as shown in FIG. 3A. Note that the mixture 320 is pumped into the container 312 at an inlet 312C, the oil is extracted at an outlet 312D, and the separated water may be extracted at another outlet 312E.

FIG. 3B illustrates a similar experiment that uses the same system 300, but the smart sand was treated with acidic water. The smart sand 200 was first pre-wetted with acidic water with a pH of 2.0, before the separation process. Then the mixture 320 of hexadecane 322 dyed with oil red O and pH 6.5 water 324 dyed with methylene blue, in a ratio of 1:3, was poured into the same filtration system 300. Water 324 selectively passed through the sand layer 302 to the bottom part 312A of the container 312, whereas the hexadecane oil 322 remained in the upper part 312B of the container 312. These experiments indicate that the sorption and desorption properties of the smart sand can be changed by changing the pH of the medium in which the smart sand is placed.

Compared to the recently used organic and inorganic based substrate materials, the advantages of desert sand for making the smart sand discussed above include its mechanical and chemical stability, environmental friendly and abundant natural resource. To achieve super-wettability, the substrate material should possess sufficient surface roughness in order to amplify its intrinsic wetting behavior. For this reason, the $SiO_2$ raw sand particles 202 were modified onto the $SiO_2$-modified sand (also known in the art as the sand@$SiO_2$) via the hydrolysis of TEOS in an alkaline environment. This process changed the smooth surface of the raw sand to a rougher surface of the $SiO_2$-modified sand due to the presence of silica nanoparticle aggregates 210 on its surface.

The surface grafted OTS provides low-surface energy chains to give hydrophobicity to the smart sand 200 under non-acidic conditions. The addition of the BPS is to functionalize the surface of the sand with bromoalkyl groups via silanization, which serves as a binder for subsequent grafting of P4VP on its surface. Then the P4VP polymer was grafted onto the surface of previously silanized sand@$SiO_2$ through the quaternization reaction between the bromoalkyl groups of BPS and the pyridyl groups of P4VP by heating under vacuum conditions. The grafted P4VP endows the sand surface with a pH-responsive wettability.

Figure 4A:
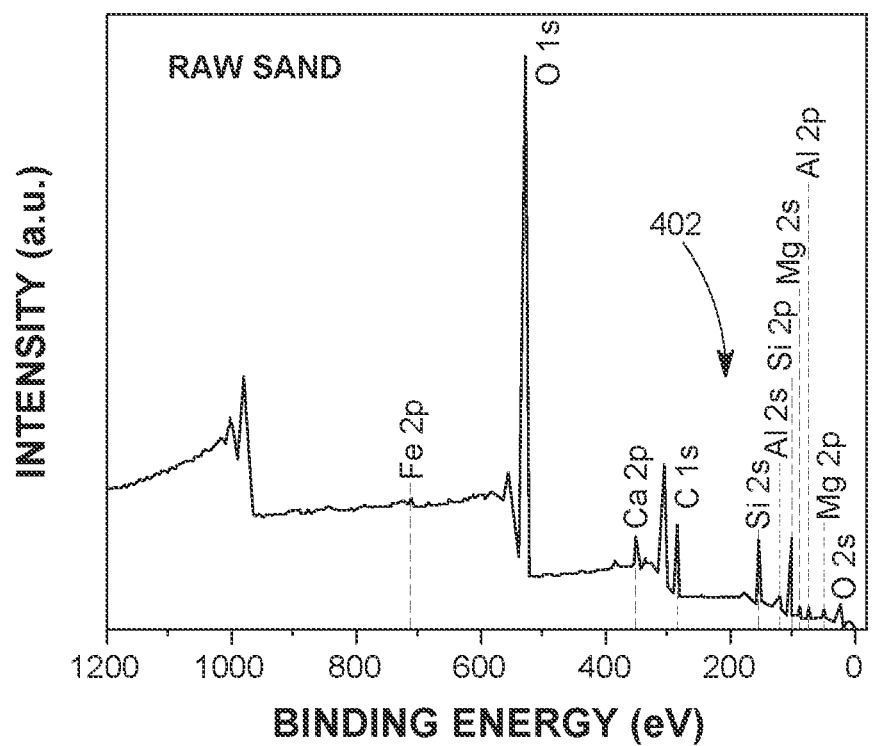
FIGS. 4A to 4F illustrate the various groups and/or elements that are added during the manufacturing process to the raw sand for obtaining the smart sand.

To further demonstrate the successful modification of the raw sand into the smart sand 200, the surface of the smart sand was analyzed by XPS. The raw sand shows in FIG. 4A (which shows the intensity (arbitrary units) on the y axis plotted over the binding energy (eV) on the x axis) significant Si and O peaks around 100 eV (Si 2p), 150 eV (Si 2s), and 530 eV (O 1s), with possible minor C 1s contaminants at around 285 eV. This result agrees with the fact that the raw sand is mainly composed of silica. Additionally, the characteristic peaks of some metal elements (Mg, Ca, Al, and Fe) 402 are also observed in the spectrum of the raw sand in FIG. 4A, due to the existence of a few metal elements in the natural sand.

Figure 4B:
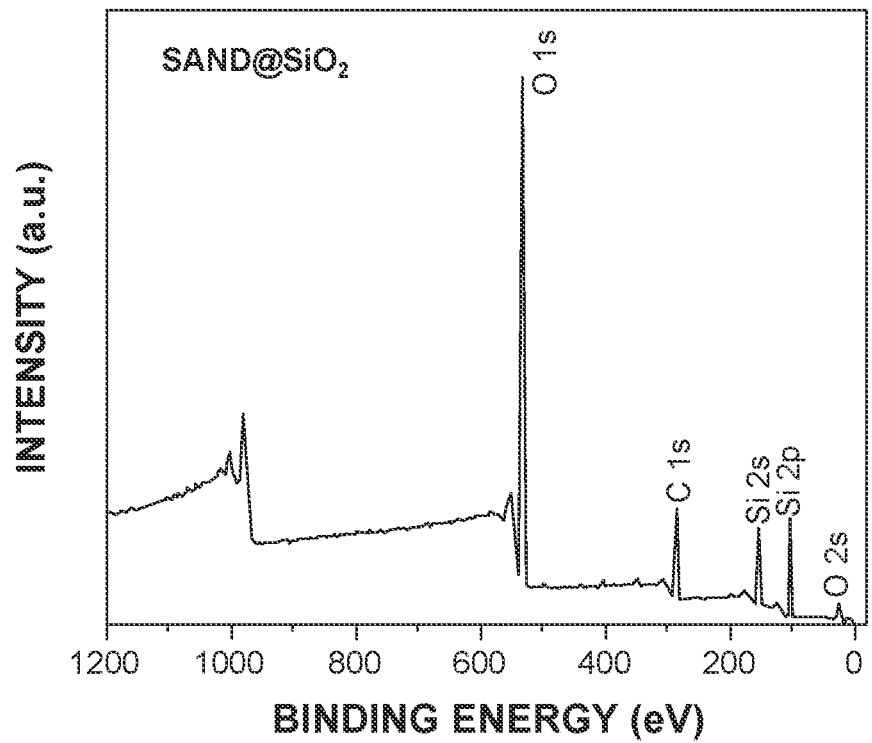
Figure 4C:
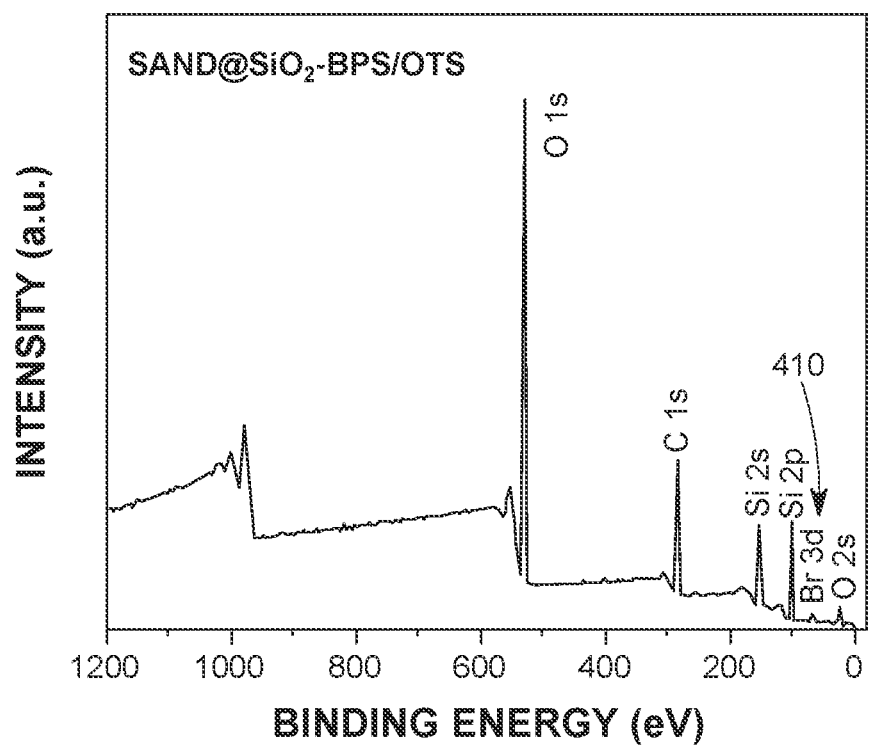
Figure 4D:
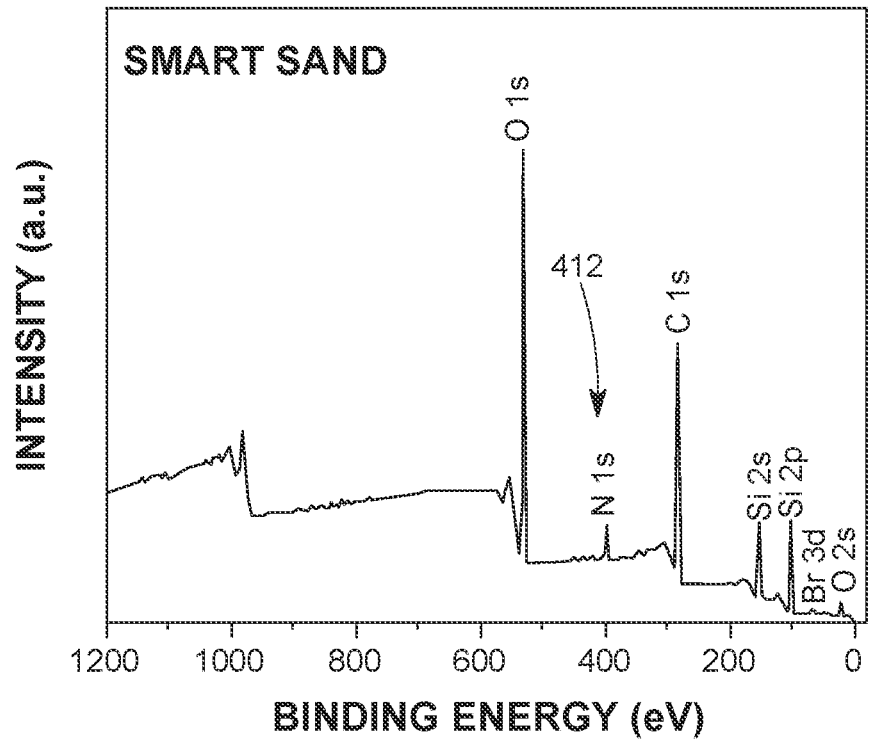
Figure 4E:
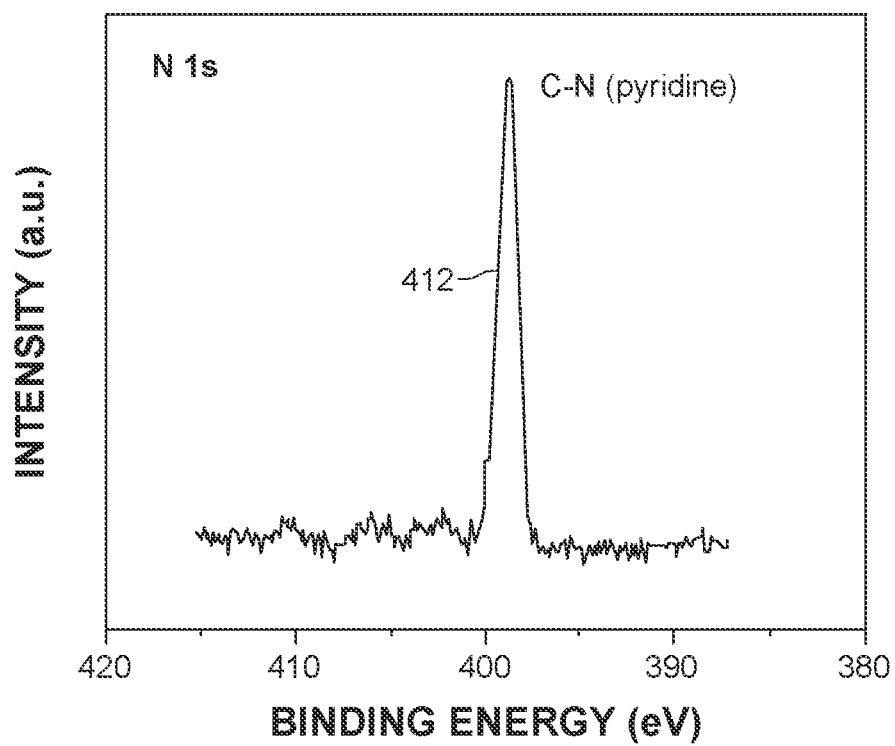
Figure 4F:
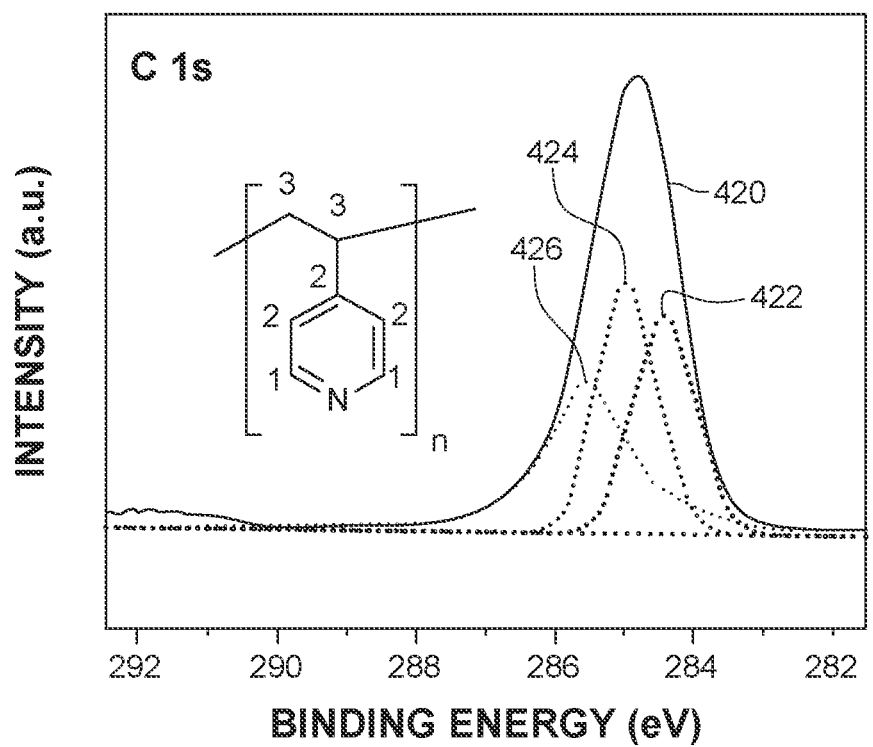

In comparison with the raw sand, the characteristic peaks of metal elements are minimal on the $SiO_2$-coated sand (see FIG. 4B), indicating that the $SiO_2$-coating layer fully covered the entire surface of the raw sand. The appearance of a Br 3d peak 410 of functionalized sand with the BPS and OTS materials in FIG. 4C suggests that the BPS was successfully grafted onto the sand surface via the silanization process. For the smart sand final product, a unique N signal peak 412 appears at around 400 eV (N 1s), see FIGS. 4D and 4E, and this peak can be assigned to the nitrogen of the pyridine groups from P4VP polymer, indicating the successful grafting of P4VP onto the surface of the smart sand. Furthermore, as shown in FIG. 4F, the high resolution C 1s core-level spectra 420 further confirms the modification of the P4VP on the modified sand surfaces due to the presence of the polymer backbone's C—C peak 422 at 284.4 eV, aromatic C—C at 285.0 eV peak 424, and aromatic C—N peak 426 at 285.5 eV.

Figure 5:
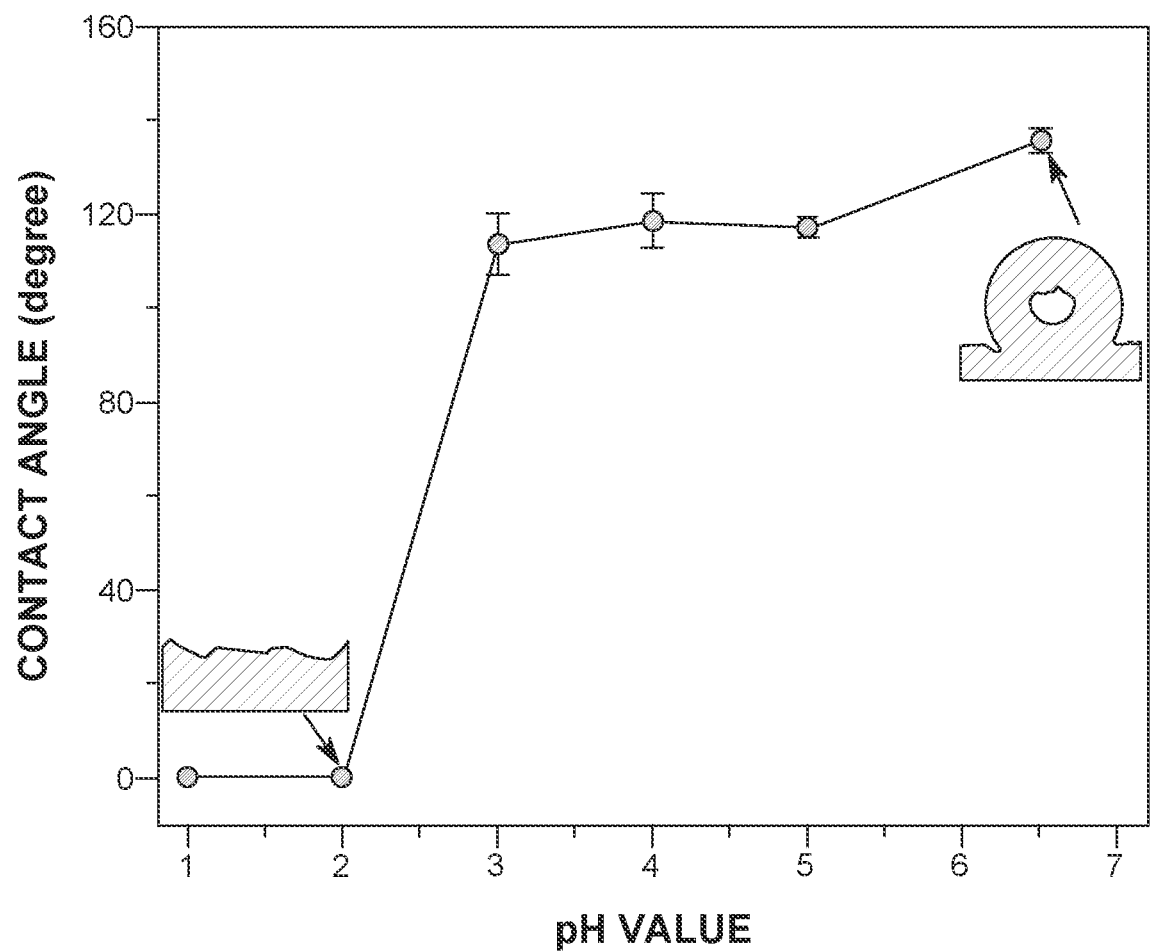
FIG. 5 illustrates how much the contact angle of the water to the smart sand can be changed by controlling the pH of the water.

The original raw sand surface is covered with a large number of hydroxyl groups, metals and silica dioxide with a high surface free energy, thus endowing the surface with intrinsic hydrophilicity and oleophilicity in air. However, after the successful addition of both P4VP and OTS to the raw sand, the surface wettability of the smart sand surfaces possesses switchable wettability between superhydrophilicity and hydrophobicity, by varying the pH of aqueous solution from 1.0 and 6.5, as illustrated in FIG. 5. FIG. 5 shows that the contact angle (measured in degrees) is small (about zero degrees, i.e., superhydrophilicity) for small values of the pH (smaller than 2), while the contact angle increases to over 100 degrees for pH values larger than 5.

Figure 6A:
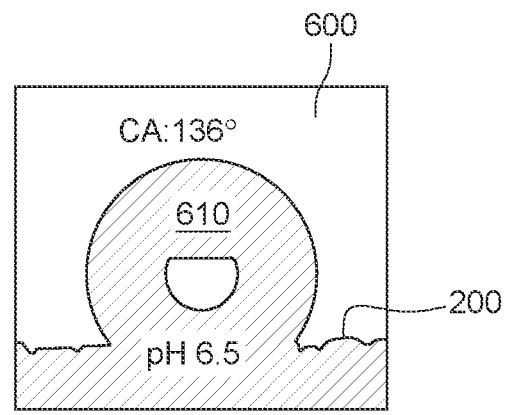
FIGS. 6A to 6D illustrate how quick the wettability of the smart sand changes with the pH of the water.
Figure 6B:
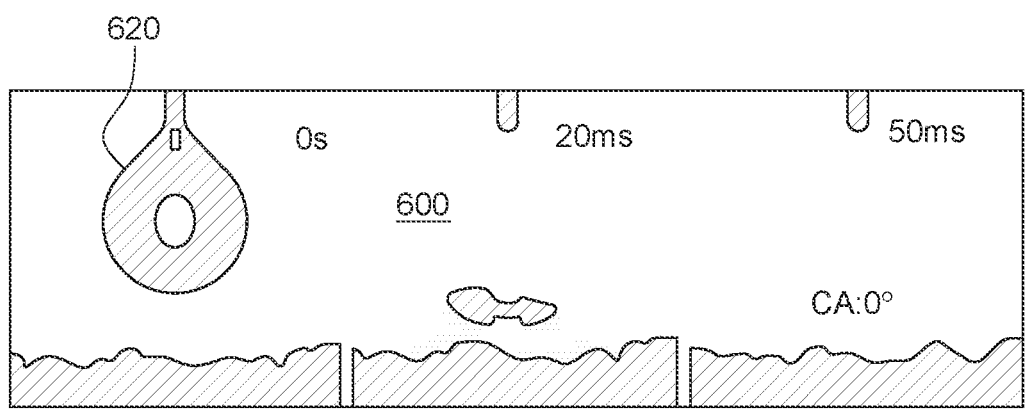

As shown in FIG. 6A, the smart sand 200 exhibits hydrophobicity in air 600 when in contact with a water droplet 610. FIG. 6A shows the water droplet 610 making a contact angle of about 136°, which can be attributed to the presence of the OTS material on the surface of the raw sand, as well as the deprotonation state of the P4VP material. Furthermore, the smart sand can float on the water surface, and the mirror-like sand surface shown underneath the water droplet 610 is because the air trapped around the hydrophobic sand prevents the water permeating into the void space between sand particles. In addition to the hydrophobicity, the oleophilicity of the OTS material endows the smart sand surface with high affinity to oil. Thus, an oil droplet 620 can be immediately adsorbed into the smart sand surface, within 0.05s, as shown in FIG. 6B. This indicates the superoleophilicity of the novel smart sand in air. Such smart sand is also able to capture oil underwater, indicating its underwater superoleophilicity.

Figure 6C:
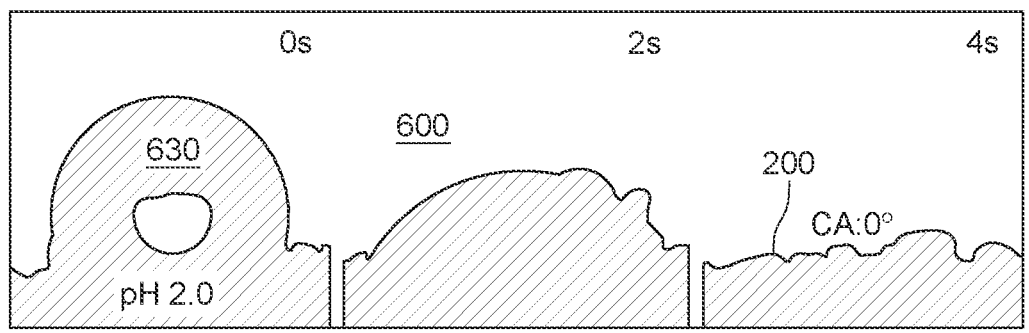
Figure 6D:
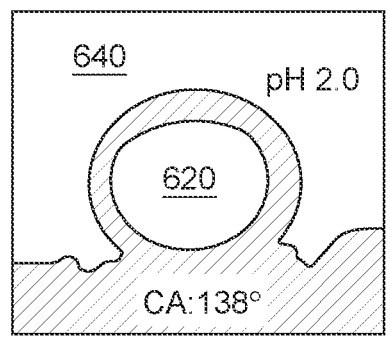

However, when an acidic water droplet 630 of pH 2.0 was placed on the surface of the smart sand 200 in air 600, as illustrated in FIG. 6C, the water droplet was quickly adsorbed into the surface of the smart sand, within 4 s, indicating the pH-responsive switchable wettability of the smart sand surface. Furthermore, the oil wettability of the smart sand can be completely reversed when it is immersed in the acidic water. The smart sand exhibits an underwater oleophobicity with an underwater oil CA of 138° in the acidic water 640 of pH 2.0, as shown in FIG. 6D, which confirms the switchable oil wettability in a low pH solution. In addition, such oil droplet can roll off easily from the sand surface, showing in one experiment a sliding angle of 7° and indicating the low oil adhesion to the smart sand surface in the acidic water.

Figure 7:
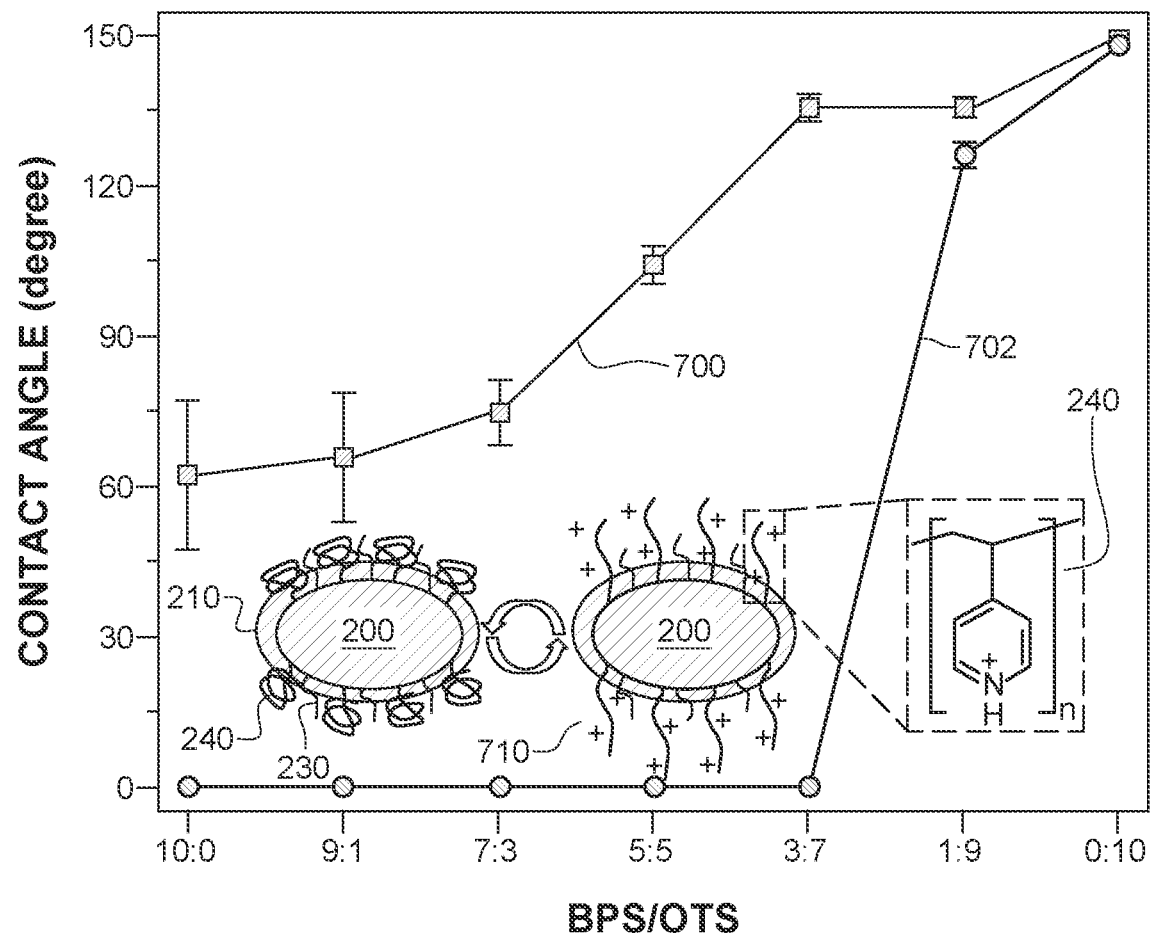
FIG. 7 illustrates the influence of various groups added to the raw sand on the water contact angle with the smart sand.

The switchable wettability of the smart sand is affected by the ratio of the BPS to OTS materials present on the surface of the modified sand, which in effect determines the ratio between the P4VP and OTS in the final smart sand. As shown in FIG. 7, the water contact angle (WCA) (represented on the y axis) of the smart sand at pH 6.5 (see curve 700) increases from 62° to 150° with the increase of the ratio of OTS to BPS, due to the increasing amount of hydrophobic OTS material 230 on the smart sand 200 surface. On the other hand, the surface wettability of the smart sand 200 could be switched to superhydrophilicity (WCA: 0°) when placed in water having a pH of 2.0, see curve 702, which can be well maintained until the ratio of BPS to OTS is adjusted to 3:7. The ratio of the BPS to OTS is plotted on the x axis in FIG. 7. Further increasing the amount of OTS relative to BPS significantly increases the WCA of the smart sand and its surface becomes hydrophobic, as noted in FIG. 7 (large contact angle). This is so because by lowering the amount of BPS material, results in a significant decrease of the grafted P4VP material 240 onto the silanized sand@$SiO_2$ via quaternization, leading to the loss of superhydrophilicity of the smart sand in water having a pH of 2.0. Thus, depending on the application, the smart sand may be engineered with different wettability properties.

Based on the results mentioned above, the switchable wettability of the smart sand depends on the amount of the P4VP and OTS materials attached to the surface of the raw sand. For water having a pH of 6.5 (i.e., non-acidic water), the P4VP is deprotonated and exhibits a collapsed conformation. Correspondingly, more hydrophobic OTS chains could dominantly expose themselves to air, which makes the sand surface to become hydrophobic and retains its high affinity to oil. In contrast, for the acidic water having a pH of 2.0, the pyridyl groups from the P4VP polymer chains are protonated considering its pKa of approximately 3.5-4.5. The protonated P4VP chains exhibit an extended conformation due to the electrostatic repulsion among the like charges 710 (see the inset of FIG. 7). Thus, they tend to stretch and expose the sand surface, resulting in the formation of a hydrophilic layer onto the sand surface. In addition, this hydrophilic layer could effectively block the access of the oil by the OTS, which endows the smart sand with superior oil-repellency ability at a low pH solution.

Figure 8:
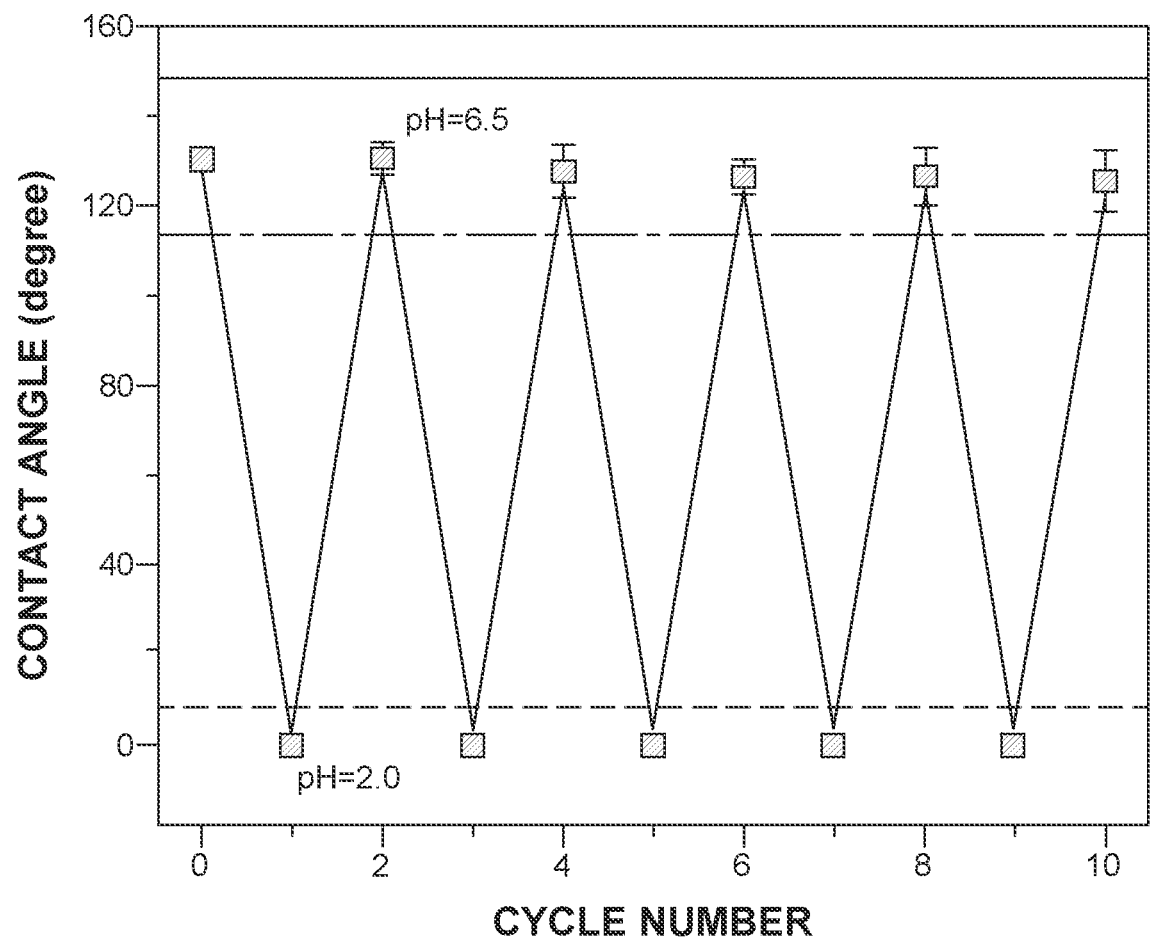
FIG. 8 illustrates how the smart sand changes its contact angle with the water repeatedly, without losing its properties, over many cycles.

The acidic-water treated smart sand can easily recover its hydrophobicity and oleophilicity after being rinsed with water and then dried in the air. This reversible cycle can be repeated many times without any significant decline observed in the switchable wettability of the smart sand, indicating that the formation of the P4VP material on the treated sand is very stable. In this regard, FIG. 8, which plots the contact angle versus the number of cycles, shows that the contact angle changes between a high value and a low value, depending on the pH of the medium in which the smart sand is placed, and these two values remain essentially constant over a number of cycles.

Based on the above discussed switchable wettability performance, the smart sand could be used for oil sorption and desorption in aqueous media with different pHs. For example, assume that there is an oil layer located at the water surface in a given container and the water has a pH of 6.5. If the smart sand is placed in this container to contact with the oil layer at the water surface, it would instantaneously absorb the oil from the water surface and then sink to the bottom of the container due to its own gravity and because of its superoleophilic properties. Moreover, this mixture of oil and sand can then be removed from the water, for example, by pumping the water out, and the absorbed oil droplets could then be spontaneously released from the smart sand by immersing the mixture into acidic water of pH 1.0. Thus, a process of sorption and desorption of oil in water can be controlled by an operator by simply adjusting the pH of the water in which the smart sand is placed.

To further understand the effect of different pHs on the oil desorption capacity of the smart sand discussed herein, the saturated oily smart sand was treated by acidic water at different pHs. The oil desorption capacity was calculated as the weight ratio of the released oil and the absorbed oil. The absorbed oil (1.0 g) was quickly released from the smart sand within 2 minutes with almost no residual oil in the sand (99%) when placed in water having a pH of 1.0. However, with the same amount of absorbed oil, it might take nearly 12 minutes with around 91% of oil desorption from the smart sand when in water having a pH of 2.0. Further, it was observed that there is no oil released from the smart sand when exposed to water having a pH of 3.0. Additionally, such sorption and desorption cycle was successfully realized with various oils, i.e., hexadecane, petroleum ether, kerosene and hexane.

These advantages of the novel smart sand are attributed to the protonated pypridyl groups of P4VP at the pH lower than 3, which are responsible for generating a surface characterized by superhydrophilicity and underwater oleophobicity, which leads to the weak affinity between the smart sand's surface and oil. Accordingly, lowering the pH value of the smart sand's ambient can make the oil release process faster and more efficient owing to the generation of more protonated pypridyl groups in a shorter time. Nevertheless, at a pH value higher than 3, the deprotonated P4VP remains in its collapsed conformation and the OTS is still dominantly exposed to the ambient, leading to the hydrophobicity and oleophilicity of the smart sand. Therefore, no oil is desorbed at this pH. These observations are consistent with the contact angle measurements shown in FIG. 5, which indicate that the WCA of the smart sand at pH 3 is around 114°. Furthermore, the novel smart sand maintains its pH responsiveness even after 6 cycles of oil sorption and desorption as show in FIG. 8.

Unlike the conventional recovery of oil based on oil/water separation materials that use mechanical squeezing or rinsing by an organic solvent, this smart sand can be repeatedly used in aqueous solutions at room temperature without generating secondary waste as organic solvent or consuming the materials of the structure. In addition, the smart sand can be molded into any shape, due to the random accumulation of the sand particles. This unique advantage is distinct from the conventional oil/water separation materials and would be able to decrease the overall material and operating costs.

Due to its switchable superoleophilicity and superoleophobicity, the novel smart sand can be used as a separating membrane for controllable oil/water separation. As discussed with regard to FIGS. 3A and 3B, a layer of smart sand can be used to either retain the oil above the smart sand and let the water move through the smart sand layer, to separate the oil from the water, or allow the oil to move through the layer of smart sand and retain the water above the layer of smart sand. These two functions can be implemented by just changing the acidity of the water. Note that the acidity of the water can be changed in any known way, for example, using an acidic chemical, replacing the existing water with acidic water, etc.

Figure 9:
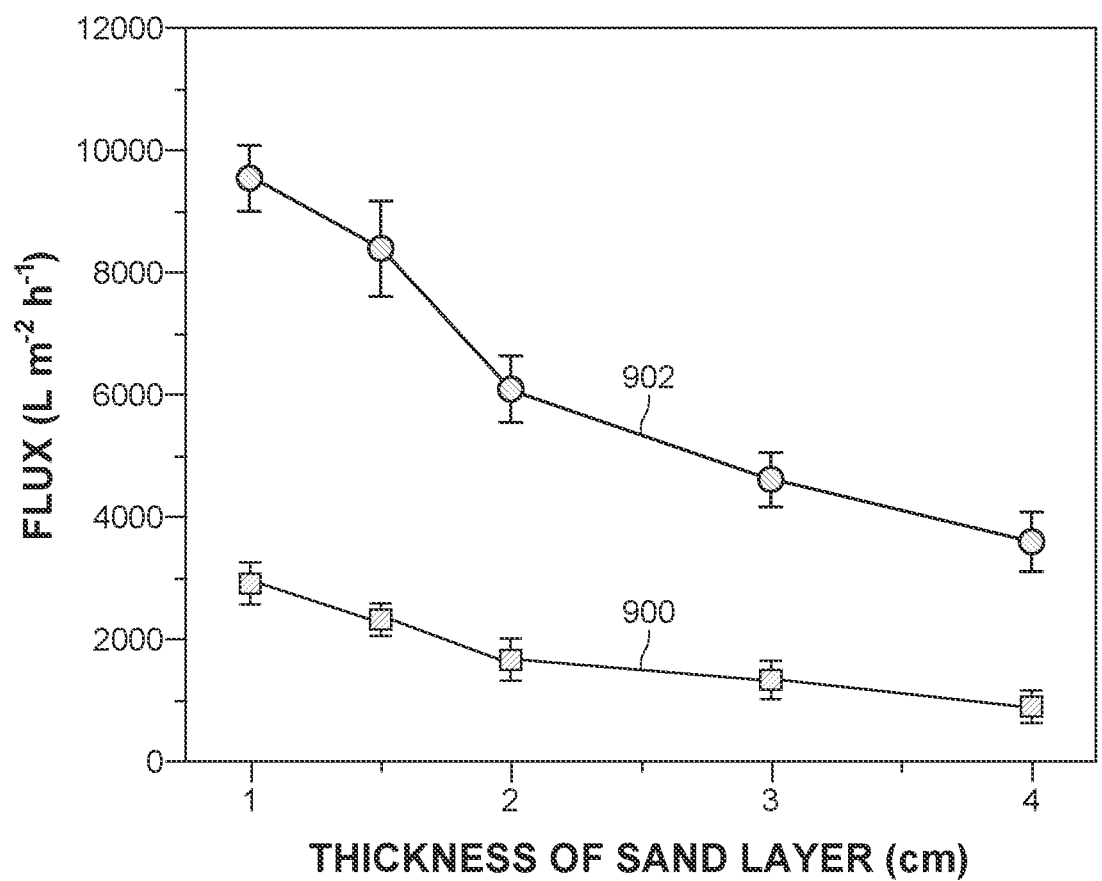
FIG. 9 illustrates the amount of water that can be separated from oil as a function of the thickness of the smart sand.

During this controllable separation processes, the water and oil fluxes through sand layers with different thicknesses were calculated by measuring the time for an oil/water mixture of a certain volume to permeate through. As shown in FIG. 9 (which plots the flux on the y axis and the thickness of the sand layer on the x axis), both the oil flux 900 and the water flux 902 decrease with the increase in the thickness of the sand layer (from 1 to 4 cm) due to a longer effective penetration distance. When the thickness of the sand layer is 1 cm, the oil and water fluxes can reach up to 2,906 and 9,556 L m$^{-2}$ h$^{-1}$, respectively. Furthermore, the difference in the water and oil fluxes (J) and the change trend of fluxes with the thickness of sand layer could be explained by the Hagen-Poiseuille equation:

$$J = \frac{\varepsilon \pi r_p 2 \Delta p}{8 \mu L} \quad (1)$$

where, $\varepsilon$ is the surface porosity, $r_p$ is the pore radius, $\Delta p$ is the pressure drop, $\mu$ is the viscosity of the penetrating solution, and L is the effective filtrate distance. As described by the above equation, the filtrate flux (J) is inversely proportional to the effective filtrate distance (L). In addition, the flux is also inversely proportional to the viscosity of the penetrating solution ($\mu$). Therefore, the water flux (1.002 mPa s at 20° C. for water) is higher than that of oil (3.474 mPa s at 20° C. for hexadecane).

The prepared smart sand, which has pH-responsive P4VP and oleophilic/hydrophobic OTS onto its surface, shows switchable wettability which is appropriate for controllable oil/water separation. In terms of the filtration-based separation, either oil or water could selectively be allowed to pass through or remain on top of the smart sand, which is suitable for oil removal from wastewater with an oil density either higher or lower than the water. This intelligent, low cost, large-scale, and highly-efficient route for oil/water separation that uses the smart sand offers a new perspective on solving the problems from practical oily industrial wastewater and oil spills.

Figure 10:
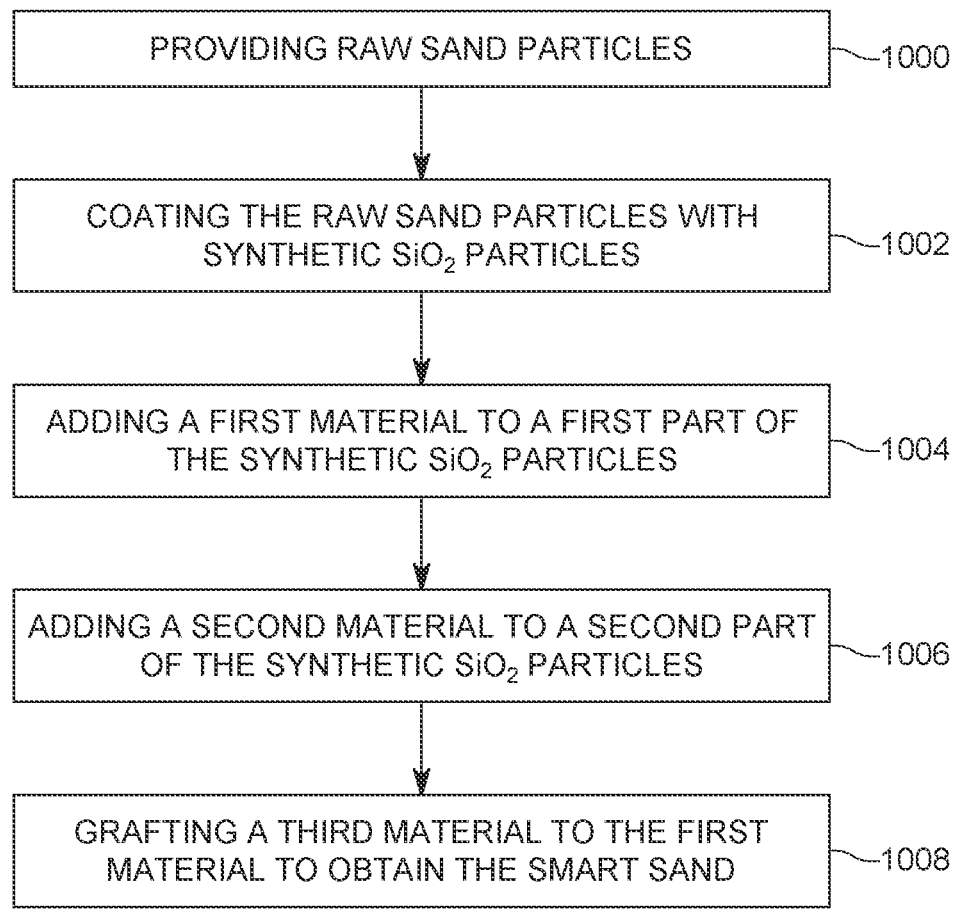
FIG. 10 is flowchart of a method for manufacturing smart sand that has a controllable wettability.

A method for making the above discussed smart sand is now discussed with regard to FIG. 10. The method includes a step 1000 of providing raw sand particles, a step 1002 of coating the raw sand particles with synthetic SiO$_2$ particles, a step 1004 of adding a first material to a first part of the synthetic SiO$_2$ particles, a step 1006 of adding a second material to a second part of the synthetic SiO$_2$ particles, and a step 1008 of grafting a third material to the first material to obtain the smart sand. Each of the first to third materials is different from each other. In one application, the first material is (3-bromopropyl)trimethoxysilane, BPS, the second material is octadecyl-trimethoxy-silane, OTS, and the third material is poly(4-vinylpyridine), P4VP.

In one application, a ratio of BPS to OTS is selected so that the smart sand is hydrophobic or hydrophilic. The step of coating may include placing the raw sand particles into cetyltrimethyl ammonium bromide and ethanol to form a mixture, increasing a pH of the mixture, and adding tetra-ethoxysilane, TEOS, to the mixture to form the synthetic SiO$_2$ particles on the raw sand. The method may further include a step of heating the smart sand under vacuum to promote quaternization between the first and third materials. The quaternization takes placed between bromoalkyl groups of the first material and pyridine groups of the third material.

The disclosed embodiments provide a smart sand that can be used to separate oil from water and this separation process can be controlled by changing the pH of the water. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] J. Yong, F. Chen, Q. Yang, H. Bian, G. Du, C. Shan, J. Huo, Y. Fang and X. Hou, Adv. Mater. Interfaces, 2016, 3, 1500650;
[2] X. Men, B. Ge, P. Li, X. Zhu, X. Shi and Z. Zhang, J. Taiwan Inst. Chem. Engrs., 2016, 60, 651-655;
[3] J. Li, C. Xu, C. Guo, H. Tian, F. Zha and L. Guo, J. Mater. Chem. A, 2018, 6, 223-230;
[4] L. Zhang, Z. Zhang and P. Wang, N P G Asia Mater., 2012, 4, e8;
[5] M. Maaz, T. Elzein, D. Dragoe, A. Bejjani, N. Jarroux, C. Poulard, N. Aubry-Barroca, B. Nsouli and P. Roger, J. Mater. Sci., 2019, 54, 1184-1196.

What is claimed is:

1. A method for making a smart sand, the method comprising:
    providing raw sand particles;
    coating the raw sand particles with synthetic $SiO_2$ particles;
    adding a first material to a first set of the synthetic $SiO_2$ particles;
    adding a second material to a second set of the synthetic $SiO_2$ particles; and
    grafting a third material to the first material to obtain the smart sand,
    wherein each of the first to third materials is different from each other.

2. The method of claim 1, wherein the first material is (3-bromopropyl) trimethoxysilane, BPS.

3. The method of claim 2, wherein the second material is octadecyl-trimethoxy-silane, OTS.

4. The method of claim 3, wherein the third material is poly(4-vinylpyridine), P4VP.

5. The method of claim 3, wherein a ratio of BPS to OTS is selected so that the smart sand is hydrophobic or hydrophilic.

6. The method of claim 1, wherein the step of coating comprises:
    placing the raw sand particles into cetyltrimethyl ammonium bromide and ethanol to form a mixture;
    increasing a pH of the mixture; and
    adding tetraethoxysilane, TEOS, to the mixture to form the synthetic $SiO_2$ particles on the raw sand.

7. The method of claim 1, further comprising:
    heating the smart sand under vacuum to promote quaternization between the first and third materials.

8. The method of claim 7, wherein the quaternization takes place between bromoalkyl groups of the first material and pyridine groups of the third material.

* * * * *